(12) United States Patent
Ashtekar et al.

(10) Patent No.: US 12,548,985 B2
(45) Date of Patent: *Feb. 10, 2026

(54) SWITCHGEAR DEVICE WITH GROUNDING DEVICE AND RELATED METHODS

(71) Applicant: JST POWER EQUIPMENT, INC., Lake Mary, FL (US)

(72) Inventors: Koustubh Ashtekar, Lake Mary, FL (US); Alex Florencia Cochran, Sanford, FL (US)

(73) Assignee: JST POWER EQUIPMENT, INC., Lake Mary, FL (US)

( * ) Notice: Subject to any disclaimer, the term of this patent is extended or adjusted under 35 U.S.C. 154(b) by 301 days.

This patent is subject to a terminal disclaimer.

(21) Appl. No.: 18/522,377

(22) Filed: Nov. 29, 2023

(65) Prior Publication Data

US 2024/0097413 A1 Mar. 21, 2024

Related U.S. Application Data

(63) Continuation of application No. 17/807,488, filed on Jun. 17, 2022, now Pat. No. 11,862,944.

(51) Int. Cl.
*H02B 13/075* (2006.01)
*H02B 13/035* (2006.01)

(52) U.S. Cl.
CPC ......... *H02B 13/075* (2013.01); *H02B 13/035* (2013.01); *H02B 13/0356* (2013.01)

(58) Field of Classification Search
CPC .................. H02B 13/035; H02B 13/0356; H02B 13/065; H02B 13/075; H02B 11/28
See application file for complete search history.

(56) References Cited

U.S. PATENT DOCUMENTS

| 4,658,329 A | 4/1987 | Kamura et al. |
| 4,709,291 A * | 11/1987 | Eggert ................ H02B 13/065 |
| | | 361/37 |
| 5,177,664 A | 1/1993 | Tsuchiya et al. |
| | (Continued) | |

FOREIGN PATENT DOCUMENTS

| CN | 108270205 A * | 7/2018 | ............... H02H 7/22 |
| CN | 110518466 A * | 11/2019 | ............... H02B 1/24 |
| | (Continued) | | |

*Primary Examiner* — Robert J Hoffberg
(74) *Attorney, Agent, or Firm* — Allen, Dyer, Doppelt + Gilchrist, PA

(57) ABSTRACT

A switchgear device may include a frame defining an interior compartment, an electrical breaker component carried within the interior compartment, and a first optical sensor carried within the interior compartment. The switchgear device has a grounding device coupled to the electrical breaker component and being within the interior compartment. The grounding device includes a grounding switch switching between a first open state (i.e., ungrounded state) and a second closed state (i.e., grounded state), and an actuation device coupled to the grounding switch and configured to cause the grounding switch to switch between the first open state and the second closed state. The switchgear device includes a controller coupled to the electrical breaker component, the first optical sensor, and the grounding device and configured to cause the grounding switch to switch to the second closed state based upon the first optical sensor.

20 Claims, 9 Drawing Sheets

(56) References Cited

U.S. PATENT DOCUMENTS

| | | | |
|---|---|---|---|
| 5,933,308 A | 8/1999 | Garzon | |
| 6,175,486 B1 | 1/2001 | Ponsioen | |
| 6,501,572 B1 * | 12/2002 | Poth | H02B 13/0356 361/605 |
| 6,633,009 B1 | 10/2003 | Shea | |
| 6,693,438 B2 | 2/2004 | Shea | |
| 8,319,136 B2 | 11/2012 | Byron et al. | |
| 8,462,486 B2 | 6/2013 | Fink et al. | |
| 8,525,053 B2 | 9/2013 | Abrahamsen et al. | |
| 8,692,149 B2 | 4/2014 | Gentsch | |
| 8,861,144 B2 | 10/2014 | Shea et al. | |
| 8,937,262 B2 | 1/2015 | Gentsch et al. | |
| 8,946,581 B2 | 2/2015 | Yabu et al. | |
| 8,975,550 B2 | 3/2015 | Sugai et al. | |
| 10,020,643 B2 | 7/2018 | Zheng | |
| 10,784,063 B1 | 9/2020 | Montich | |
| 10,916,391 B1 * | 2/2021 | Payne | G02B 6/4292 |
| 11,257,634 B2 | 2/2022 | Ramesh | |
| 11,502,500 B2 | 11/2022 | Reuberger | |
| 11,735,893 B2 | 8/2023 | Hanna et al. | |
| 11,742,638 B2 | 8/2023 | Hanna et al. | |
| 11,742,639 B2 | 8/2023 | Hanna et al. | |
| 11,757,265 B2 | 9/2023 | Hanna et al. | |
| 11,762,020 B2 | 9/2023 | Hanna et al. | |
| 11,862,944 B1 * | 1/2024 | Ashtekar | H02B 13/075 |
| 2005/0189325 A1 | 9/2005 | Schweizer et al. | |
| 2008/0217153 A1 | 9/2008 | Bottcher et al. | |
| 2009/0120773 A1 | 5/2009 | Gentsch et al. | |
| 2009/0141430 A1 | 6/2009 | Jung et al. | |
| 2012/0044616 A1 | 2/2012 | Takahashi et al. | |
| 2013/0341171 A1 | 12/2013 | Espeseth et al. | |
| 2020/0219672 A1 | 7/2020 | Ramesh | |
| 2021/0193416 A1 | 6/2021 | Attar et al. | |
| 2021/0327665 A1 | 10/2021 | Tehlar et al. | |
| 2021/0376579 A1 | 12/2021 | Gentsch et al. | |
| 2021/0408783 A1 | 12/2021 | Gentsch et al. | |
| 2022/0271518 A1 | 8/2022 | Hanna et al. | |
| 2022/0326165 A1 | 10/2022 | Liang | |
| 2023/0194609 A1 | 6/2023 | Fischer-Carne et al. | |
| 2023/0197362 A1 | 6/2023 | Fischer-Carne et al. | |
| 2023/0268151 A1 | 8/2023 | Fischer-Carne et al. | |
| 2024/0258045 A1 * | 8/2024 | Ahn | H01H 3/264 |

FOREIGN PATENT DOCUMENTS

| | | | |
|---|---|---|---|
| DE | 4000721 | 7/1990 | |
| DE | 19601639 A1 * | 7/1997 | H02B 13/065 |
| KR | 101723522 | 4/2017 | |

* cited by examiner

SWITCHGEAR DEVICE WITH GROUNDING DEVICE AND RELATED METHODS

RELATED APPLICATION

This application is a continuation of prior filed copending application Ser. No. 17/807,488 filed Jun. 17, 2022, the entire subject matter of which is incorporated herein by reference in its entirety.

TECHNICAL FIELD

The present disclosure relates to the field of electrical power systems, and, more particularly, to a switchgear device and related methods.

BACKGROUND

Metal-clad or metal-enclosed medium voltage switchgear systems operate as three-phase systems that connect to the three-phase power distribution grid and provide various control functions and provide protection against short circuit events and similar overcurrent, terminal fault, ground fault, line fault or other fault conditions. These switchgear systems include power transformers (PT) to reduce the primary circuit voltage, which can be greater than 1,000 volts, to a much lower voltage that may energize control circuits or monitor or meter the primary voltage. These switchgear systems and associated load circuits may be protected from damage by a fuse when the transformers fail. The transformers and fuses may be mounted together as an assembly on a truck that is movable as a platform within the switchgear frame and associated interior compartment (usually in draw-out air insulated switchgear (AIS)) or assembled fixed inside the switchgear compartment (usually in gas insulated switchgear (GIS)).

Given the voltage level of medium voltage switchgear systems, electrical faults may cause serious damage to equipment if not handled promptly. Indeed, electrical faults, if left unmitigated, can quickly become dangerous to personnel if not handled in a timely fashion, which is on the order of tens of milliseconds. One particular electrical fault of concern is the arc fault, where current flows through an unplanned path, for example, air. When an arc fault occurs within the medium voltage switchgear system, the situation can become dangerous rather quickly. In particular, once the arc fault occurs in the medium voltage switchgear system, plastic components burn within 100 milliseconds; copper components burn within 200 milliseconds; and steel components burn within 300 milliseconds, which may lead to permanently irreversibly destructive explosive failure of the medium voltage switchgear system frame.

Because of the dangerous nature of the arc fault, there are some approaches to addressing this problem with a grounding switch, which converts the arc fault into a bolted/grounded fault. For example, U.S. Patent Application Publication No. 2021/0408783 to Gentsch et al. discloses a photovoltaic cell-based arc detection with an integrated grounding switch. U.S. Patent Application Publication No. 2009/0120773 to Gentsch et al. discloses another grounding switch based upon an explosive engagement mechanism. U.S. Patent Application Publication No. 2005/0189325 to Schweizer et al. discloses a grounding switch for a medium voltage switchgear system, and the switch is electronically activated from outside the gas insulated chamber. The mechanism is based upon an actuation of a threaded post. In yet another approach, the grounding switch is tied to a frangible wall within the medium voltage switchgear system. When pressure from the arc fault builds within the medium voltage switchgear system, the frangible wall breaks and closes the grounding switch, converting arc fault into a bolted or a grounded fault.

SUMMARY

Generally, a switchgear device (e.g., a GIS device or an AIS, device, or solid insulated switchgear (SIS) device) may include a frame defining an interior compartment, an electrical breaker component carried within the interior compartment, and a first optical sensor carried within the interior compartment. The switchgear device may comprise a grounding device coupled to the electrical breaker component and being within the interior compartment. The grounding device includes a grounding switch switching between a first open state (i.e., ungrounded state) and a second closed state (i.e., grounded state), and an actuation device coupled to the grounding switch and configured to cause the grounding switch to switch between the first open state and the second closed state. The switchgear device comprises a controller coupled to the electrical breaker component, the first optical sensor, and the grounding device and configured to cause the grounding switch to switch to the second closed state based upon the first optical sensor.

In some embodiments, the grounding device may be accessible from an exterior of the frame. The switchgear device may also include a plurality of mirrors carried within the interior compartment and aligned with the first optical sensor. The actuation device comprises one of a magnetic actuation device, an electrical actuation device, and a mechanical actuation device, for example. The controller may be configured to cause the electrical breaker component to switch to an open state based upon the first optical sensor. The grounding device may comprise an axle, and a linkage coupled to the axle, the grounding switch coupled to the linkage, and the grounding switch may comprise at least one switch arm coupled to the linkage and having a first end, and a second end opposite the first end, the first end being coupled to the frame. The actuation device may be coupled to a distal end of the axle.

Also, the frame may comprise at least one viewing window carried thereby and aligned with the at least one switch arm. The interior compartment may comprise an upper compartment above the electrical breaker component, and a lower compartment below the electrical breaker component. The switchgear device may also comprise three incoming cable connectors carried in the upper compartment, and three outgoing cable connectors carried in the lower compartment.

In some embodiments, the first optical sensor may be carried within the upper compartment. The switchgear device may further comprise a second optical sensor carried within the lower compartment and coupled to the controller, and third and fourth optical sensors carried outside the interior compartment and coupled to the controller. The controller may be configured to cause the grounding switch to switch to the second closed state based upon the second optical sensor, and the third and fourth optical sensors.

Another aspect is directed to a method of making a switchgear device. The method may include coupling an electrical breaker component carried within an interior compartment of a frame, coupling a first optical sensor carried within the interior compartment, and coupling a grounding device to the electrical breaker component and being within the interior compartment. The grounding device may include a grounding switch switching between a first open state and a second closed state, and an actuation device coupled to the grounding switch and configured to cause the grounding switch to switch between the first open state and the second closed state. The method may comprise coupling a controller to the electrical breaker component, the first optical sensor, and the grounding device and configured to cause the grounding switch to switch to the second closed state based upon the first optical sensor.

DETAILED DESCRIPTION

Figure 1:
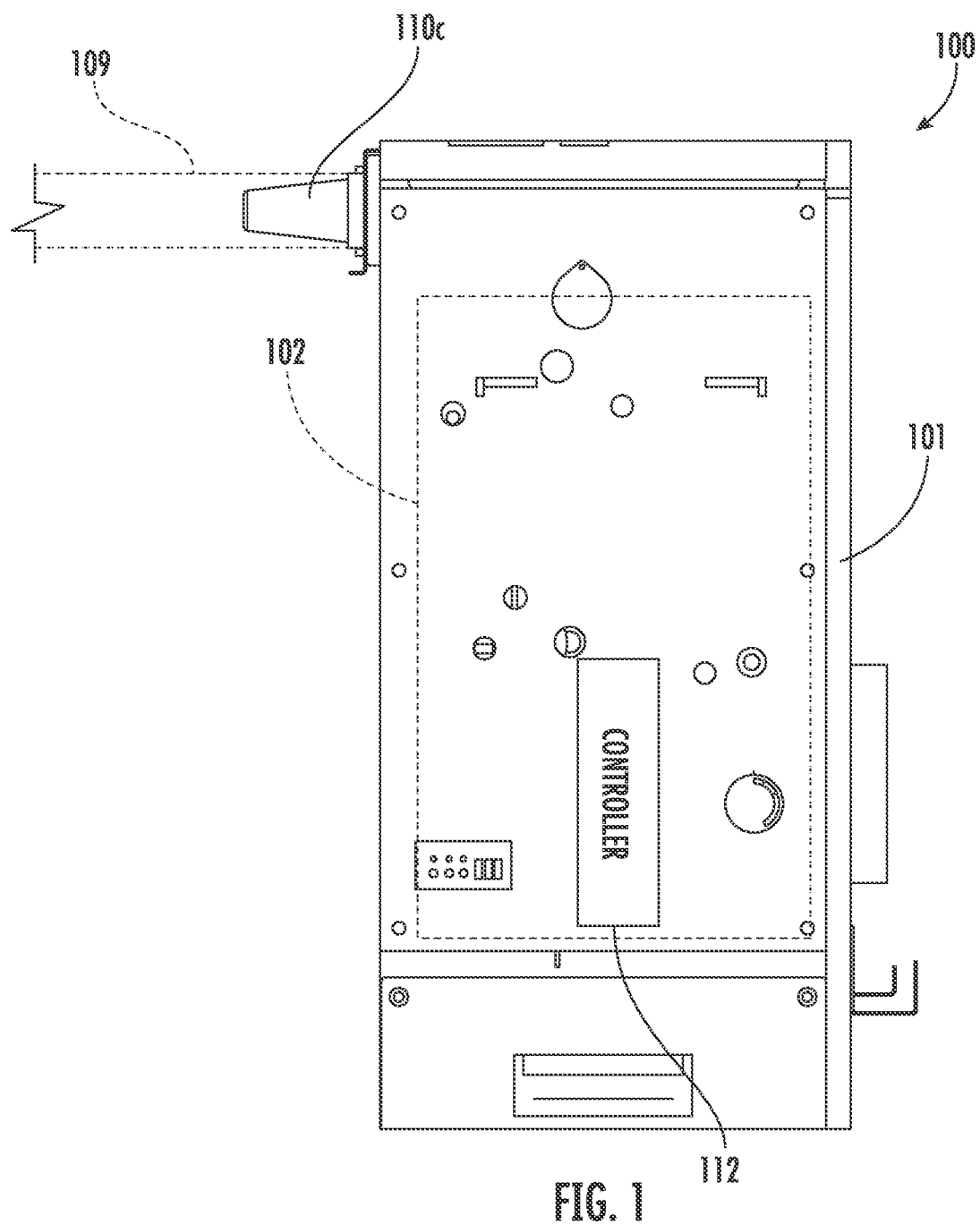
FIG. 1 is a schematic side view of a switchgear device, according to the present disclosure.
Figure 2:
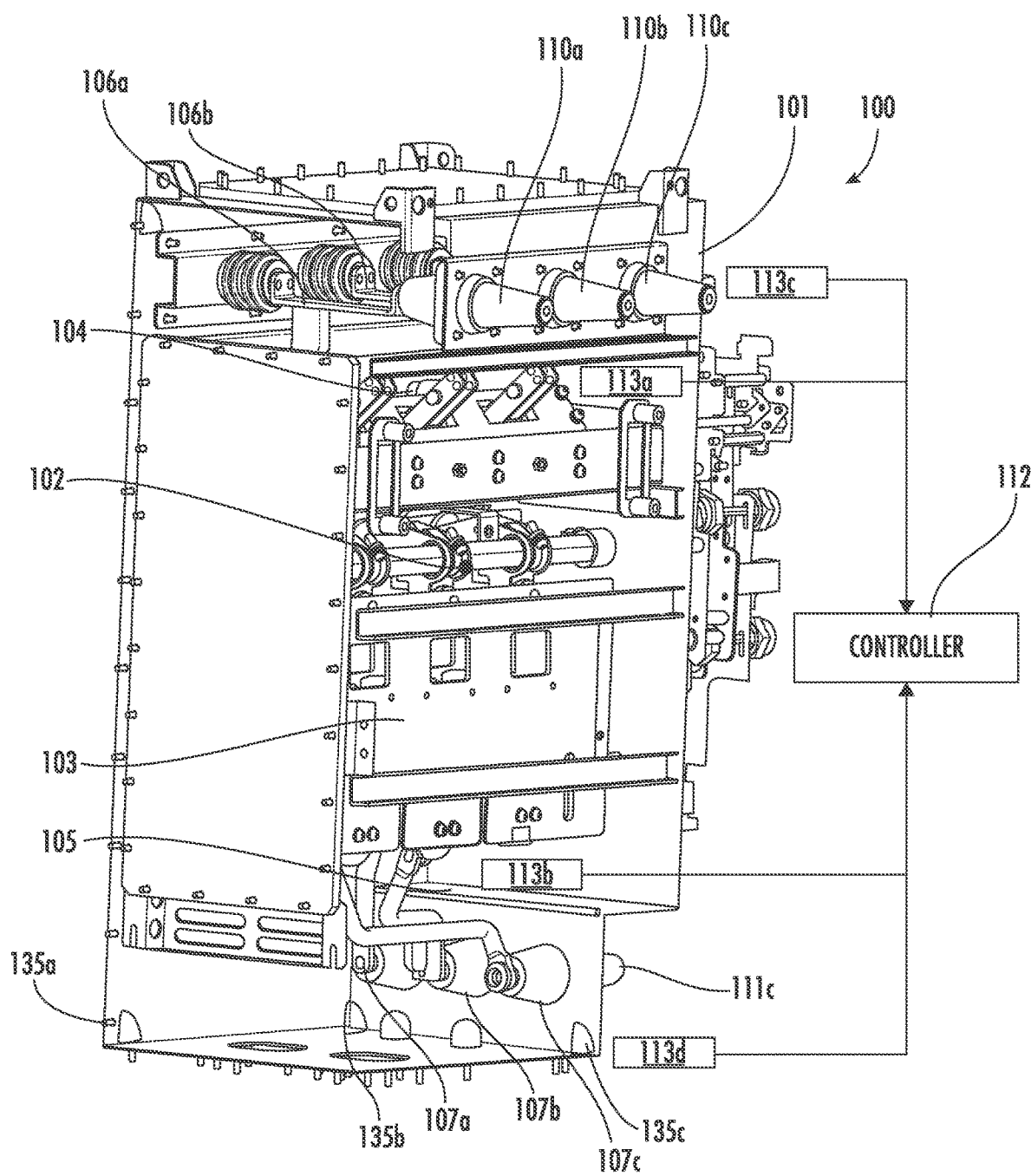
FIG. 2 is a schematic perspective view of the switchgear device from FIG. 1 with portions of a frame and a grounding device removed.
Figure 3:
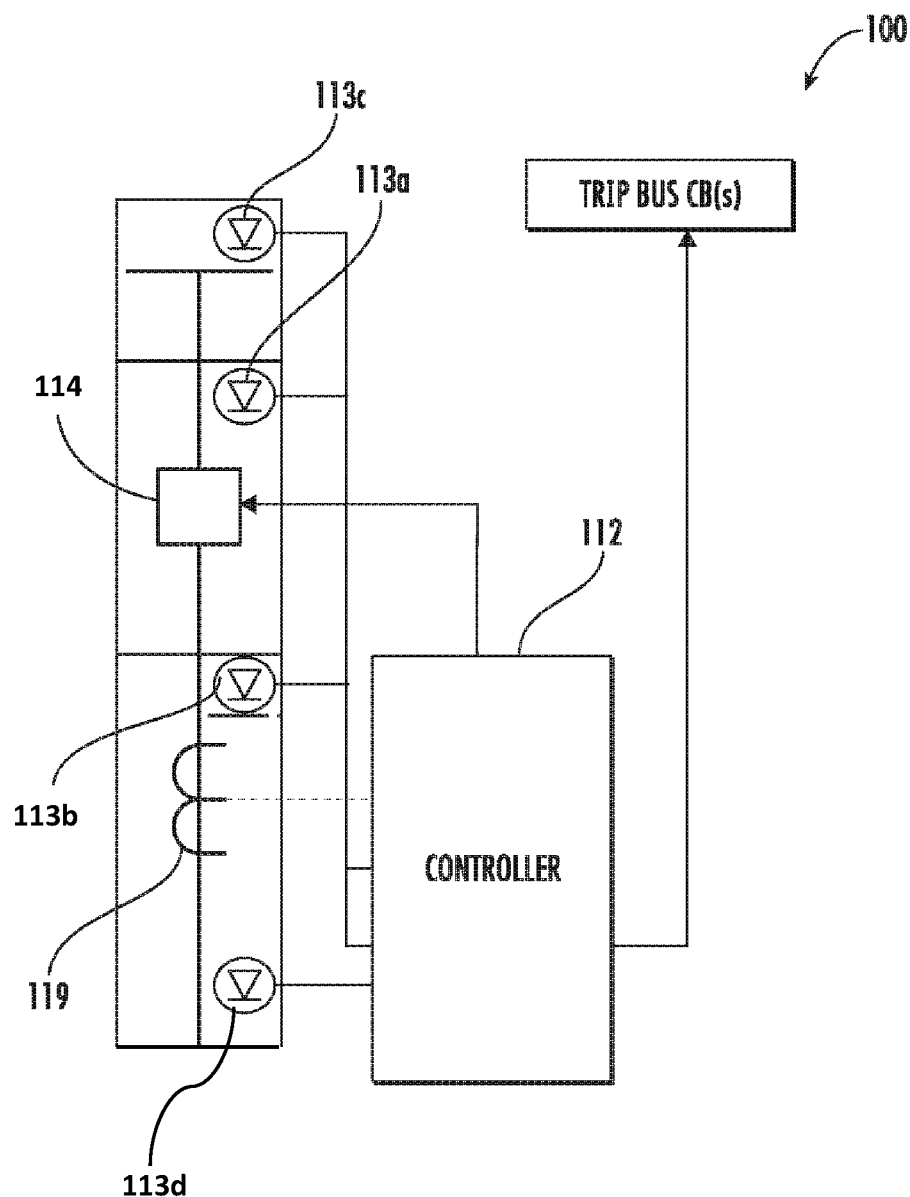
FIG. 3 is a circuit diagram of the switchgear device from FIG. 1.
Figure 4:
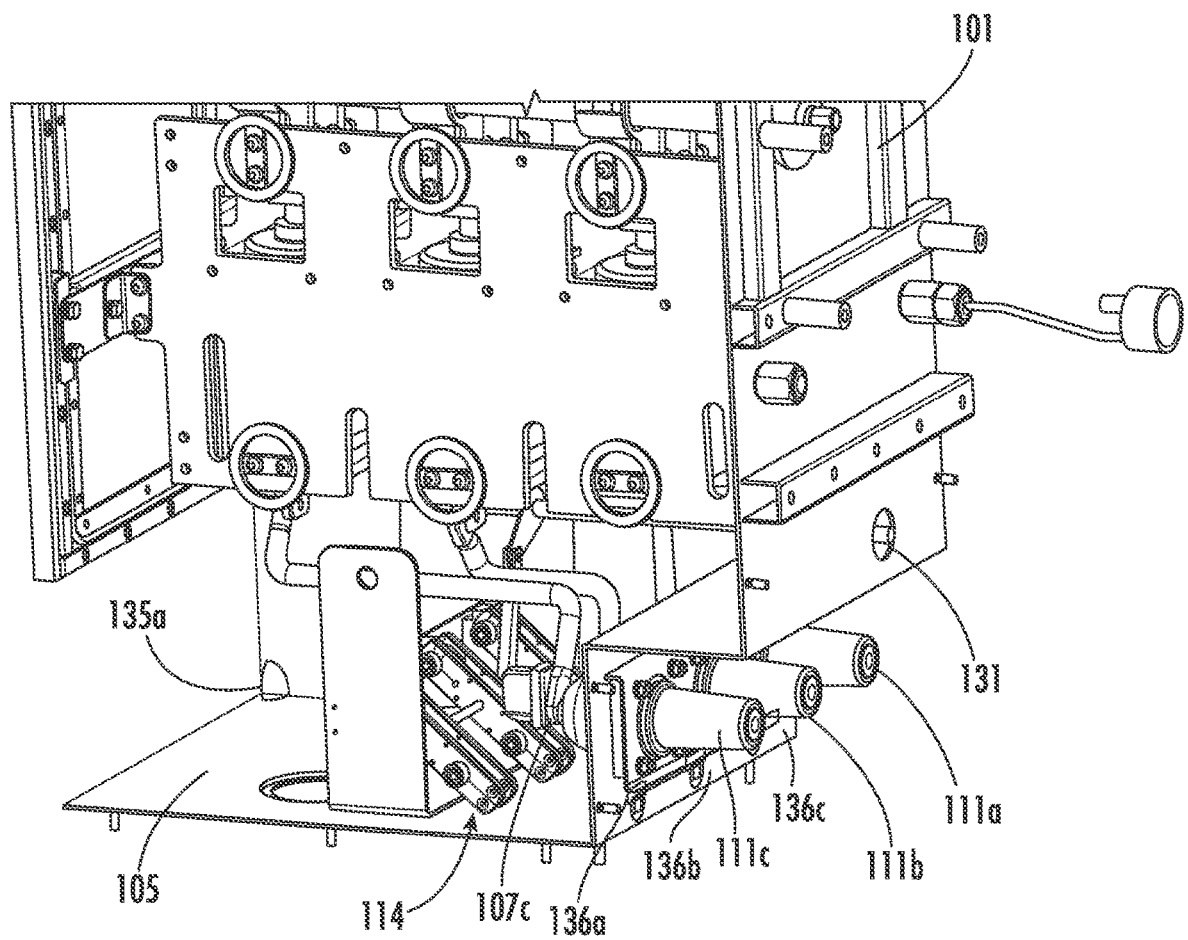
FIG. 4 is a partial schematic perspective view of a lower compartment of the switchgear device from FIG. 1 with portions of the frame removed while in a first open state.
Figure 5:
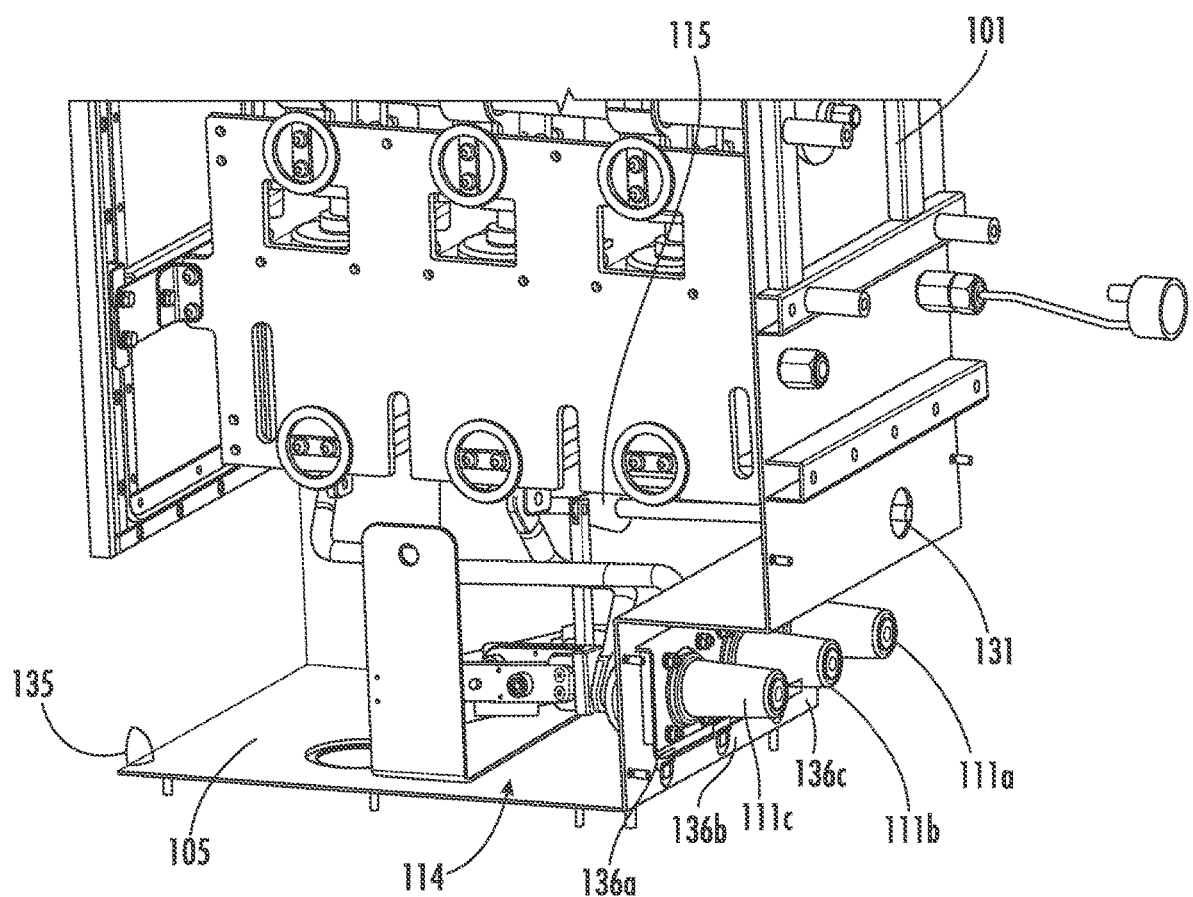
FIG. 5 is a partial schematic perspective view of the lower compartment of the switchgear device from FIG. 1 with portions of the frame removed while in a second closed state.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-7, a GIS device 100 according to the present invention is now described. The GIS device 100 includes a frame 101 defining a sealed interior compartment 102, and an electrical breaker component 103 carried within the sealed interior compartment. The electrical breaker component 103 may be a circuit breaker, an earthing switch, contactor, reclosure, load break switch, isolator switch or disconnect switch, for example. For example, the frame 101 may comprise a metal material, such as steel. The GIS device 100 can alternately be an AIS device or a SIS device in other embodiments. As will be appreciated, the frame 101 includes a closable door (not shown). The sealed interior compartment 102 contains a dielectric gas (e.g., air in AIS embodiments or sulfur hexafluoride ($SF_6$) and/or other gases but not limited to such as—$N_2$, dry Air, $CO_2$, Fluro nitrile, Fluro ketone or any gas mixture therein in GIS embodiments) or any liquid not limited to e.g., FR3 Natural esters), and comprises an air tight seal (in GIS embodiments) to contain the dielectric gas therein. In AIS embodiments, the sealed interior compartment 102 may only be enclosed (i.e., not necessarily sealed). The sealed interior compartment 102 illustratively includes an upper compartment 104 above the electrical breaker component 103, and a lower compartment 105 below the electrical breaker component. The upper and lower compartment can be interchangeably designated based on the type of application.

The GIS device 100 includes three incoming cable connectors 106a-106c carried in the upper compartment 104, and three outgoing cable connectors 107a-107c carried in the lower compartment 105. As will be appreciated, the three incoming cable connectors 106a-106c and the three outgoing cable connectors 107a-107c respectively carry three phases of power through the GIS device 100. The GIS device 100 includes three incoming cable bushings 110a-110c respectively coupled to the three incoming cable connectors 106a-106c and carried outside the sealed interior compartment 102 adjacent the upper compartment 104. The three incoming cable bushings 110a-110c respectively receive three incoming power cables 109 (FIG. 1). The GIS device 100 includes three outgoing cable bushings 111a-111c respectively coupled to the three outgoing cable connectors 107a-107c and carried outside the sealed interior compartment 102 adjacent the lower compartment 105. The three outgoing cable bushings 111a-111c respectively receive three outgoing power cables (not shown).

As will be appreciated, the electrical breaker component 103 is configured to selectively control the flow of power between the three incoming cable connectors 106a-106c and the three outgoing cable connectors 107a-107c by selectively creating an open circuit therebetween. The electrical breaker component 103 includes additional circuitry configured to monitor the flow of power between the three incoming cable connectors 106a-106c and the three outgoing cable connectors 107a-107c, and selectively activate the electrical breaker component when the flow of power exceeds one or more operational thresholds (i.e., when electrical faults are detected).

The GIS device 100 illustratively comprises a controller 112 coupled to the electrical breaker component 103. As will be appreciated, the controller 112 comprises circuitry configured to execute control logic. For example, the controller 112 may comprise a general purpose integrated circuit device, or an application specific integrated circuit (ASIC) device.

The GIS device 100 illustratively comprises a first optical sensor 113a carried within the sealed interior compartment 102 and coupled to the controller 112. In particular, the first optical sensor 113a is carried within the upper compartment 104 above the electrical breaker component 103. The GIS device 100 illustratively includes a second optical sensor 113b carried within the lower compartment 105 adjacent the three outgoing cable connectors 107a-107c and coupled to the controller 112. The GIS device 100 illustratively comprises third and fourth optical sensors 113c-113d carried outside the sealed interior compartment and coupled to the controller 112. The third optical sensor 113c is adjacent the three incoming cable bushings 110a-110c, and the fourth optical sensor 113d is adjacent the three outgoing cable bushings 111a-111c.

The GIS device 100 illustratively comprises a current transformer (CT) 119 configured to sense a current flowing via all phases. Thus, there are three CTs (one per phase), and these CTs will be providing a secondary current signal (proportional to the actual current flowing through the primary conductors). This signal is provided to the controller 112.

Of course, the number of optical sensors 113a-113d in the illustrated embodiment is merely exemplary. In some embodiments, additional optical sensors can be added to provide more coverage for detecting potential arc faults. In some embodiments where cost is a concern, the number of optical sensors 113a-113d may be reduced, and a plurality of mirrors 135a-135c could be deployed in combination and aligned with one or more of the plurality of optical sensors. In particular, the first and second optical sensors 113a-113b in the sealed interior compartment 102 may be reduced to a single optical sensor and a plurality of mirrors 135a-135c angled to reflect to the single optical sensor. Of course, there is some added detection delay due to the longer potential light propagation path, but the time delay would be negligible (order of nanoseconds). In addition, the frame 101 illustratively includes a plurality of viewing windows (136a-136c) carried by the sealed container, in such a way that it aligned with three phases and operator can see the moving grounding contacts (i.e., the aligned switch arms 120a-120c) through the viewing windows. This feature provides the visual confirmation that the equipment is not grounded and thus, no internal arcing event has happened.

The GIS device 100 illustratively comprises a grounding device 114 coupled downstream from the electrical breaker component 103 and being within the sealed interior compartment 102. As perhaps best seen in FIGS. 4-5, the grounding device 114 includes an axle 115 extending between the sealed interior compartment 102 and an exterior of the frame 101. Of course, the transition of the axle 115 through the frame 101 does not disturb the sealed nature of the sealed interior compartment 102 (e.g., using a circumferential sealing mechanism, such as a set of O-rings).

The grounding device 114 illustratively comprises a linkage 116 coupled to the axle 115, and a grounding switch 117 coupled to the linkage and switching between a first open (i.e., ungrounded) state and a second closed (i.e., grounded) state. In particular, the grounding switch 117 comprises a plurality of aligned switch arms 120a-120c coupled to the linkage 116 and having a first end 121, and a second end 122 opposite the first end. The first end 121 is permanently coupled (i.e., electrically grounded) to the frame 101. The linkage 116 is configured to cause the second end 122 of the plurality of aligned switch arms 120a-120c to couple to the three outgoing cable connectors 107a-107c in the second closed state. In other words, the electrical path from the three outgoing cable connectors 107a-107c is grounded to the frame 101.

The linkage 116 is configured to cause the second end 122 of the plurality of aligned switch arms 120a-120c to be spaced apart from the three outgoing cable connectors 107a-107c in the first open state. The linkage 116 illustratively includes a radial arm 123 coupled to the axle 115 in a rotationally fixed position, a vertical arm 124 coupled to the radial arm, and a transaxle 125 coupled to the vertical arm opposite the radial arm. The radial arm 123, the vertical arm 124, and the transaxle 125 may comprise one or more electrical insulating materials.

Figure 6:
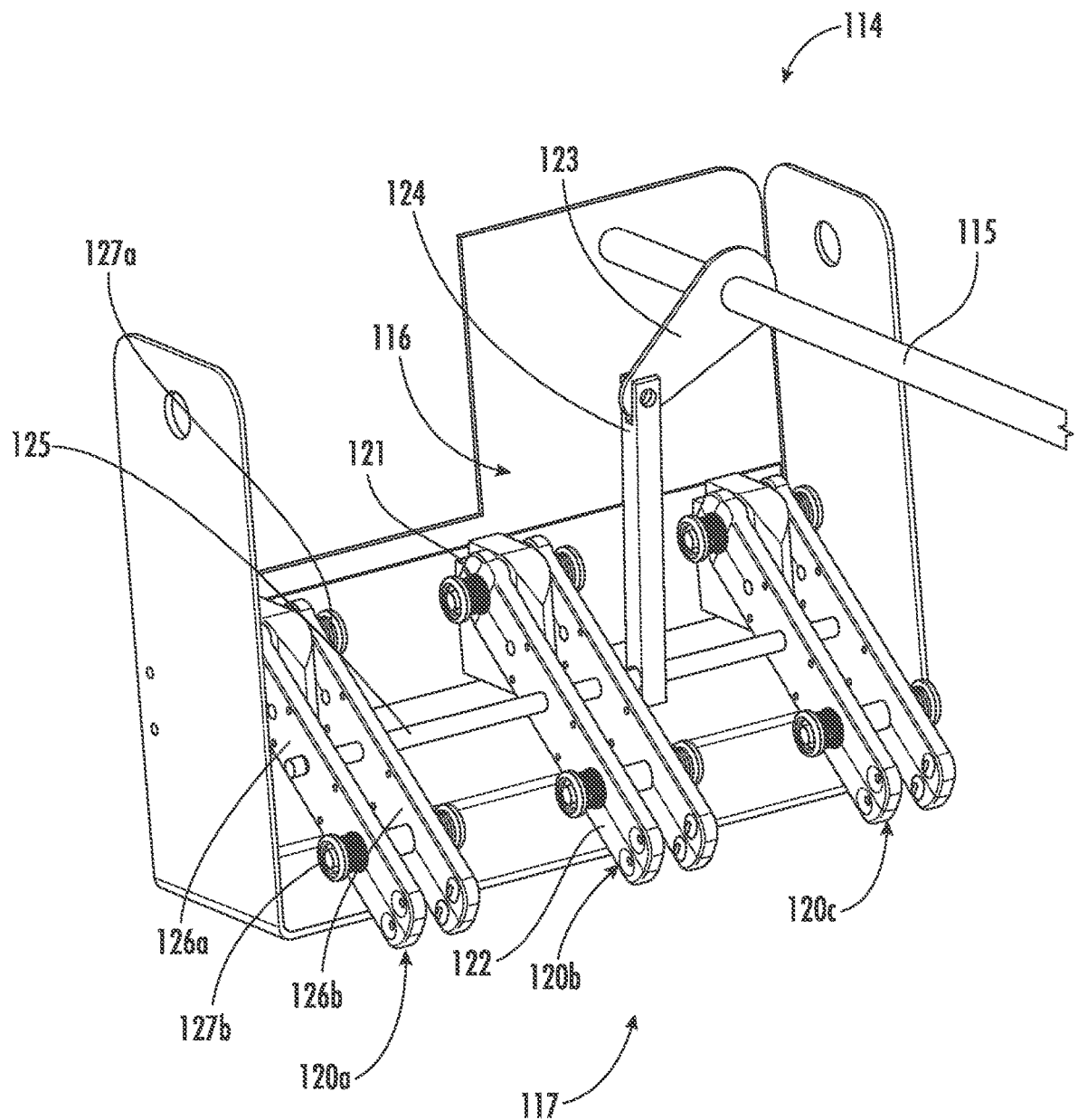
FIG. 6 is a schematic perspective view of the grounding device from the switchgear device of FIG. 1 while in the first open state.
Figure 7:
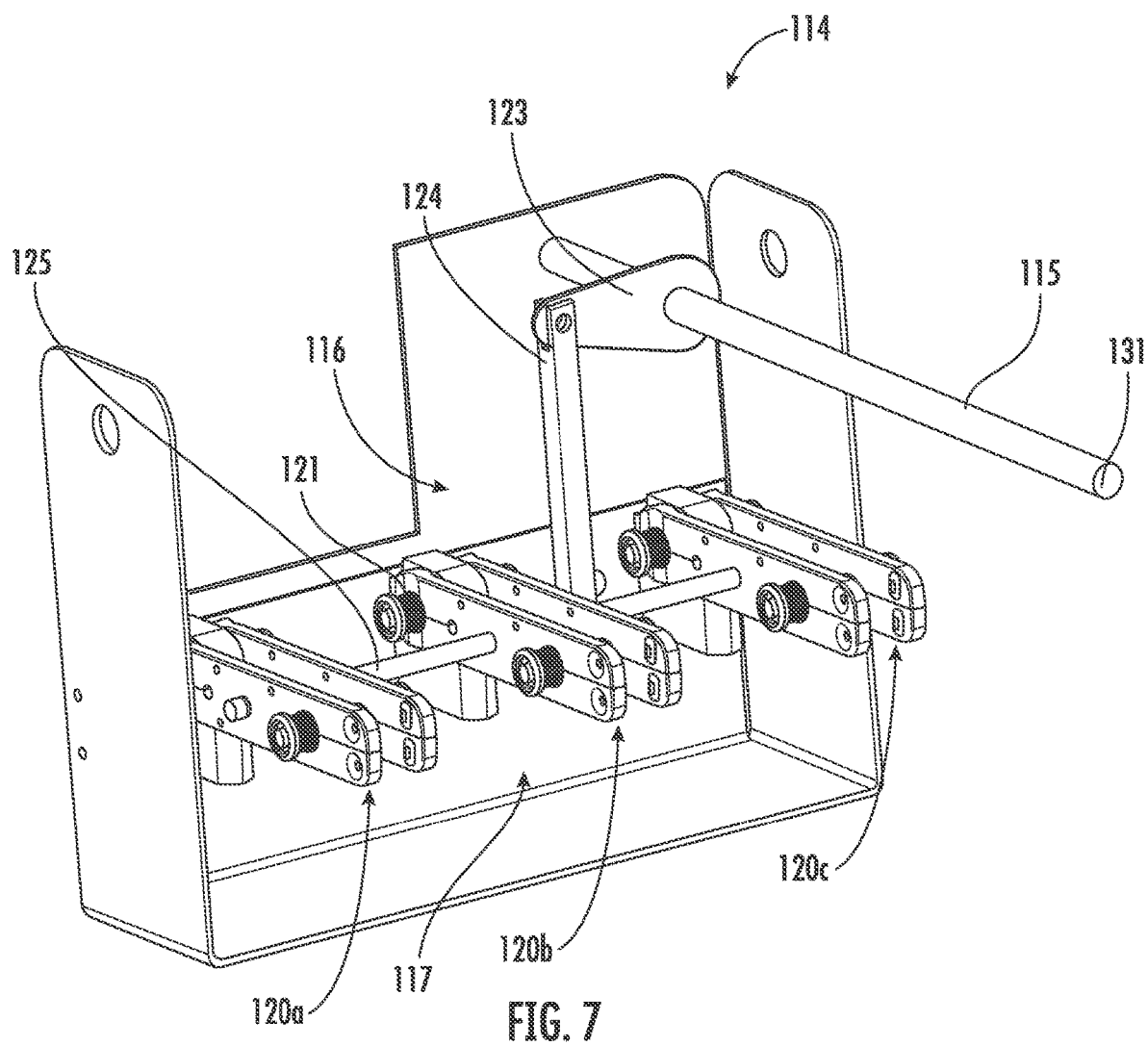
FIG. 7 is a schematic perspective view of the grounding device from the switchgear device of FIG. 1 while in the second closed state.

As perhaps best seen in FIGS. 6-7, each of the plurality of aligned switch arms 120a-120c comprises first and second elongate conductor arms 126a-126b in alignment with each other, and first and second fasteners 127a-127b coupling the first and second elongate conductor arms together. Also, when switching between the first open state and the second closed state, the plurality of aligned switch arms 120a-120c pivot about the second fasteners 127a.

The controller 112 is configured to cause the grounding switch 117 to switch to the second closed state based upon one or more of the first optical sensor 113a, the second optical sensor 113b, the third optical sensor 113c, and the fourth optical sensor 113d. In particular, each of the first optical sensor 113a, the second optical sensor 113b, the third optical sensor 113c, and the fourth optical sensor 113d may comprise an image sensor circuit configured to detect arc conditions (i.e., arc flashes) adjacent thereto. In some advantageous embodiments, the image sensor circuit may comprise a high speed photodetector, such as ultrafast photodetectors or avalanche photodiodes (APDs) having a detection or rise time as low as 15 picoseconds. Additionally, the controller 112 is configured to cause the electrical breaker component 103 to switch to an open state based upon one or more of the first optical sensor 113a, the second optical sensor 113b, the third optical sensor 113c, and the fourth optical sensor 113d.

The controller 112 is configured to control the grounding switch 117 via rotation of the axle 115. In particular, the rotation of the axle 115 of about 40°-45° (but not limited to) should change the state of the grounding switch 117 between the first open state and the second closed state. The grounding device 114 illustratively includes an actuation device 130 coupled to a distal end 131 of the axle 115, outside the sealed interior compartment 102.

In some embodiments, the controller 112 is configured to selectively activate the grounding device 114 and/or the electrical breaker component 103 depending on the location of the triggered optical sensors 113a-113d. In some embodiments, the electrical breaker component 103 comprises a plurality of breaker components within the sealed interior compartment 102, and the controller is configured to activate the respective breaker component closest to the triggered optical sensor.

Figure 8A:
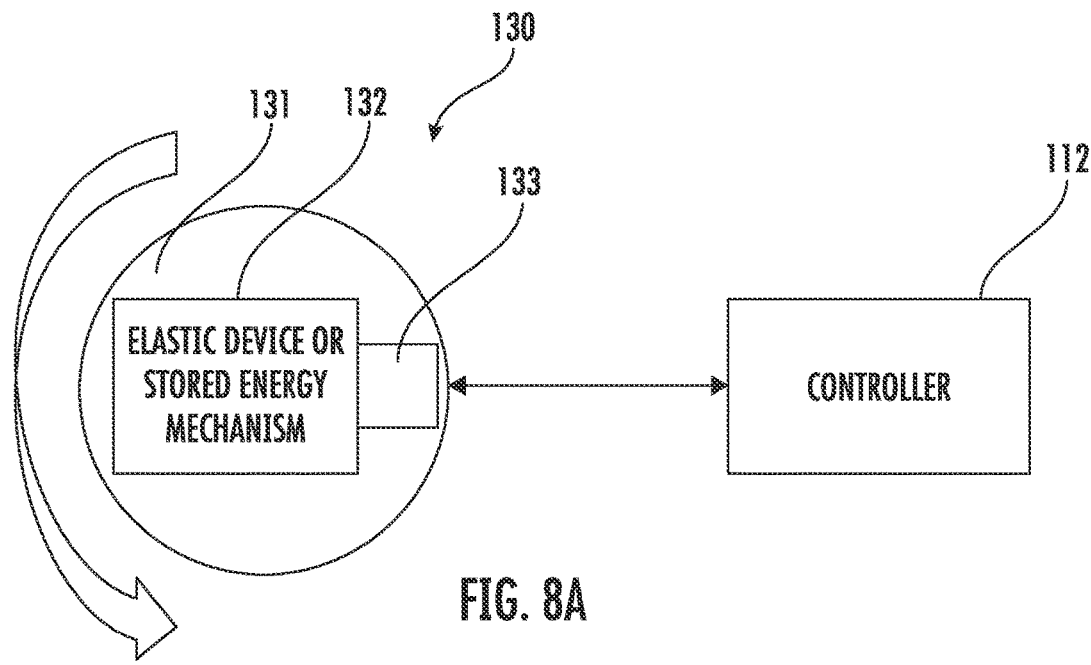
FIG. 8A is a schematic diagram of a first embodiment of an actuation device from the switchgear device of FIG. 1.

Referring now additionally to FIG. 8A, in some embodiments, the actuation device 130 illustratively includes an elastic device/stored energy device 132 (e.g., torsion spring, spring, pneumatic, hydraulic) coupled to the distal end 131 of the axle 115, and a release mechanism 133 coupled to the elastic device. Here, the controller is configured to activate the release mechanism 133, which causes the elastic device 132 to rotate the distal end 131 of the axle 115. Advantageously, the elastic device 132 can be charged manually or reset manually by personnel from the exterior of the sealed interior compartment 102.

In other embodiments, the actuation device 130 is carried within the sealed interior compartment 102, and the distal end 131 of the axle 115 may not extend through the frame 101. In yet other embodiments, even if the actuation device 130 is inside the sealed interior compartment 102, the extension of the distal end 131 of the axle 115 may protrude out of the sealed interior compartment. This extension outside the sealed interior compartment 102 can be easily used to manually charge the elastic device.

Another aspect is directed to a method of making a GIS device 100. The method includes coupling an electrical breaker component 103 carried within a sealed interior compartment 102 of a frame 101, and coupling a first optical sensor 113a carried within the sealed interior compartment. The method further includes coupling a grounding device 114 to the electrical breaker component 103 and being within the sealed interior compartment 102. The grounding device 114 includes an axle 115 extending between the sealed interior compartment 102 and an exterior of the frame 101, a linkage 116 coupled to the axle, and a grounding switch 117 coupled to the linkage and switching between a first open state and a second closed state. The method comprises coupling a controller 112 to the electrical breaker component 103, the first optical sensor 113a, and the grounding device 114 and configured to cause the grounding switch 117 to switch to the second closed state based upon the first optical sensor.

Figure 8B:
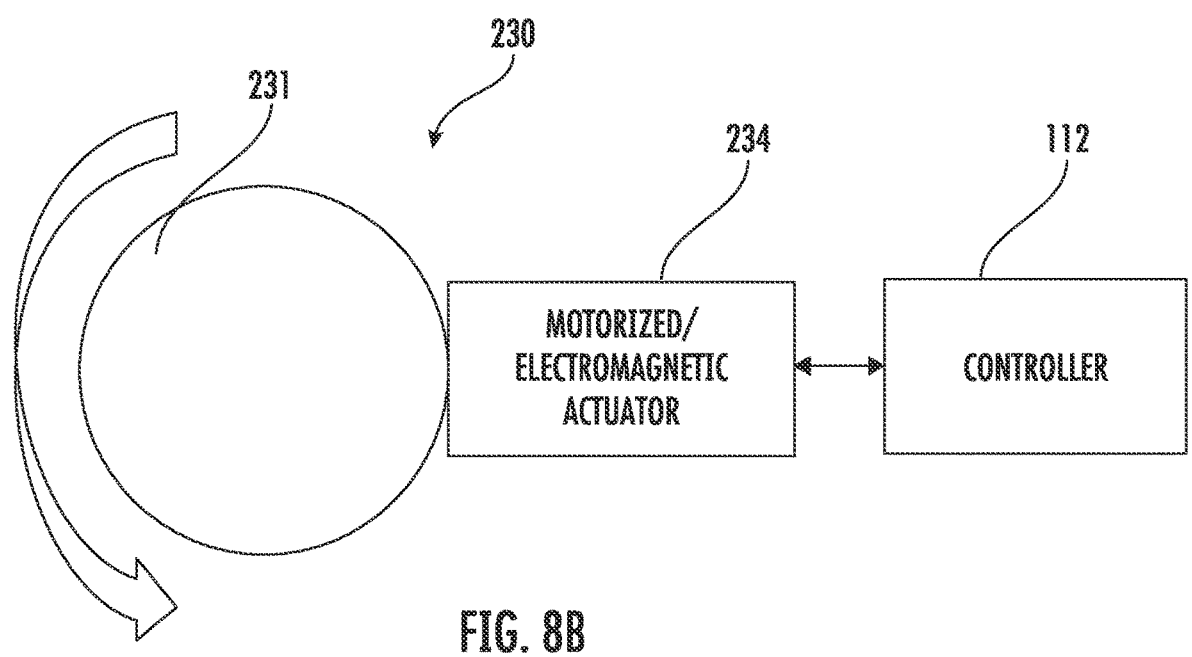
FIG. 8B is a schematic diagram of a second embodiment of the actuation device from the switchgear device of FIG. 1.

Referring now additionally to FIG. 8B, another embodiment of the actuation device 230 is now described. In this embodiment of the actuation device 230, those elements already discussed above with respect to FIG. 8A are incremented by 100 and most require no further discussion herein. This embodiment differs from the previous embodiment in that this actuation device 230 illustratively includes an electric (e.g., electromagnetic actuator, motorized actuator, or any mechanized actuator) actuator 234 coupled to rotate the distal end 231 of the axle 115. In some embodiments, the distal end 231 of the axle 115 may have radial gearing, and the electric actuator 234 may comprise a linear actuator configured to engage the radial gearing, such as disclosed in the hereinbelow noted related patent applications. In other embodiments, the electric actuator 234 may comprise a rotary actuator configured to engage the distal end 231 of the axle 115. Advantageously, the tripping delay time for this embodiment is less than the embodiment of FIG. 8A. Again, as with the embodiment of FIG. 8A, this mechanism can be reset and charged for the next grounding event from outside of the sealed compartment 102.

Figure 9:
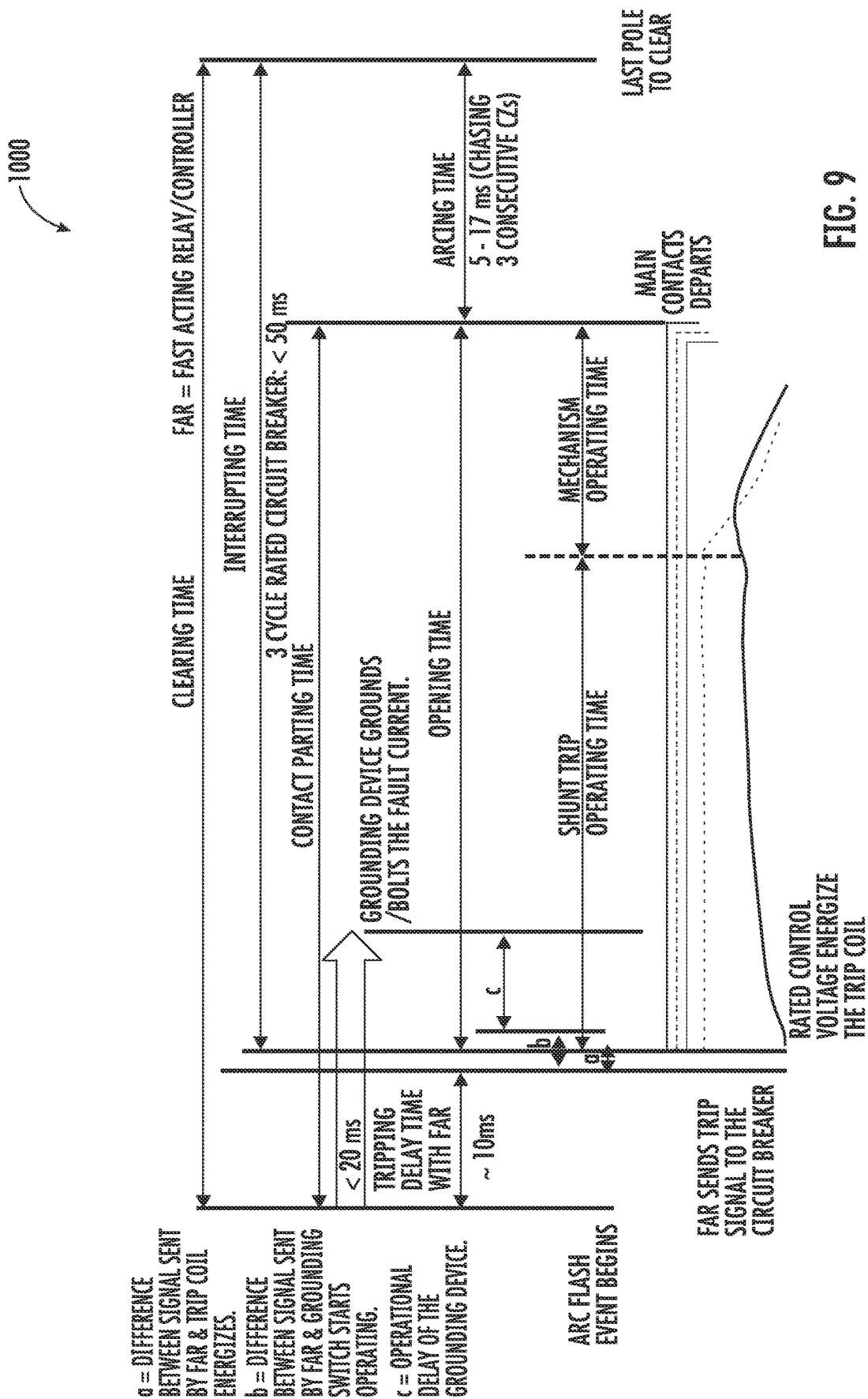
FIG. 9 is a timing diagram from the switchgear device of FIG. 1.

Referring now additionally to FIG. 9, a diagram 1000 shows timing in the GIS device 100 during an arc fault event. Starting from the far left bar, the arc fault event occurs. The next bar represents the delay from occurrence of the arc fault event to when any of the optical sensors 113a-113d generates a tripping signal (i.e., using high speed photodetectors, about 2-3 milliseconds). The time between the second and third bars is noted as "a" and represents the time difference between the tripping signal being sent and the electric actuator 234 being energized. The time between the second and fourth bars is noted as "b" and represents the time difference between the tripping signal being sent and the electric actuator 234 starting movement of the grounding device 114. The time between the fourth and fifth bars is noted as "c" and represents the operational delay of the grounding device 114 (i.e., 4-8 milliseconds). When the grounding device 114 is activated, the electrical breaker component 103 is also activated. The electrical breaker component 103 is slower than the grounding device 114, and the total interrupting time may take up to 2 seconds.

Advantageously, the GIS device 100 may provide improvements over existing arc fault mitigation devices. Firstly, the GIS device 100 may recognize and mitigate the arc fault in less time than existing approaches. Indeed, in embodiments using high speed photodetectors, the only delay in clearing the arc fault is the delay time of the electric actuator. Moreover, the GIS device 100 may deploy its arc flash mitigation approach without disturbing the sealed interior compartment 102 and releasing the dielectric gas, which may be toxic (due to biproducts of the internal arc burning). In fact, is some applications, once the cause of the arc fault has been cleared, the GIS device 100 may be readily returned to a normal operational state without opening the sealed compartment 101.

Moreover, the GIS device 100 may deploy its arc flash mitigation approach multiple times without the need for replacement. Also, the GIS device 100 includes an arc flash mitigation approach that is less expensive than existing approaches.

Yet another aspect is directed to a method of operating a switchgear device 100. The method includes providing an electrical breaker component 103 carried within an interior compartment 102 of a frame 101, providing optical sensors 113a-113d carried within the interior compartment, and providing a grounding device 114 coupled to the electrical breaker component and being within the interior compartment. The grounding device 114 includes an axle 115 extending between the interior compartment 102 and an exterior of the frame 101, a linkage 116 coupled to the axle, and a grounding switch 117 coupled to the linkage and switching between a first open state (i.e., ungrounded state) and a second closed state (i.e., grounded state). The method comprises operating a controller 112 coupled to the electrical breaker component 103, the optical sensors 113a-113d, and the grounding device 114 and configured to cause the grounding switch 117 to switch to the second closed state based upon at least the first optical sensor.

The method also includes actuating the grounding device 114 from outside the interior compartment 102. Helpfully, the user can reset or charge the grounding device 114 without opening the interior compartment 102. The method also includes actuating the grounding device 114 a plurality of times without replacing or servicing the grounding device 114 (i.e., servicing beyond manually resetting or charging it).

Other features relating to switchgear device are disclosed in co-pending applications: SWITCHGEAR SYSTEM HAVING TRANSLATABLE AND ROTATABLE TRUCK AND ASSOCIATED METHOD, U.S. Patent Application Publication No. US2022/0271516; SWITCHGEAR SYSTEM HAVING CHAIN DRIVEN CIRCUIT BREAKER AND ASSOCIATED METHODS, U.S. Pat. No. 11,735,893; SWITCHGEAR SYSTEM HAVING TRUCK DRIVEN SHUTTER MECHANISM, U.S. Pat. No. 11,742,639; RAPID X-RAY RADIATION IMAGING SYSTEM AND MOBILE IMAGING SYSTEM, U.S. Patent Application Publication No. US2022/0326165; MEDIUM-VOLTAGE SWITCHGEAR SYSTEM HAVING SINGLE PHASE BREAKER CONTROL, U.S. Pat. No. 11,735,385; SWITCHGEAR SYSTEM HAVING CONTACT ARM ASSEMBLY FOR SWITCHGEAR CIRCUIT BREAKER, U.S. Pat. No. 11,742,638; SWITCHGEAR SYSTEM THAT DETERMINES CONTACT EROSION IN CIRCUIT BREAKER, U.S. Patent Application Publication No. US2023/0197362; TESTING SYSTEM THAT DETERMINES CONTACT EROSION IN CIRCUIT BREAKER, U.S. Patent Application Publication No. US2023/0194609; SWITCHGEAR GROUND AND TEST DEVICE HAVING INTERCHANGEABLE GROUNDING BARS, U.S. Patent Application Publication No. US2023/0258723; and CIRCUIT BREAKER HAVING VACUUM INTERRUPTERS AND SINGLE-PHASE CONTROL WITH MAGNETIC ACTUATORS AND ASSOCIATED METHOD, U.S. Patent Application Publication No. US2023/0268151, all incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A switchgear device comprising:
a frame defining an interior compartment;
an electrical breaker component carried within the interior compartment;
a first optical sensor carried within the interior compartment;
a grounding device coupled to the electrical breaker component and being within the interior compartment, the grounding device comprising:
a grounding switch switching between a first open state and a second closed state, and
an actuation device coupled to the grounding switch and configured to cause the grounding switch to switch between the first open state and the second closed state; and
a controller coupled to the electrical breaker component, the first optical sensor, and the grounding device and configured to cause the grounding switch to switch to the second closed state based upon the first optical sensor.

2. The switchgear device of claim 1 wherein the grounding device is accessible from an exterior of the frame.

3. The switchgear device of claim 1 further comprising a plurality of mirrors carried within the interior compartment and aligned with the first optical sensor.

4. The switchgear device of claim 1 wherein the actuation device comprises one of a magnetic actuation device, an electrical actuation device, and a mechanical actuation device.

5. The switchgear device of claim 1 wherein the controller is configured to cause the electrical breaker component to switch to an open state based upon the first optical sensor.

6. The switchgear device of claim 1 wherein the grounding device comprises an axle, and a linkage coupled to the axle, the grounding switch coupled to the linkage; and wherein the grounding switch comprises at least one switch arm coupled to the linkage and having a first end, and a second end opposite the first end, the first end being coupled to the frame.

7. The switchgear device of claim 6 wherein the actuation device is coupled to a distal end of the axle.

8. The switchgear device of claim 6 wherein the frame comprises at least one viewing window carried thereby and aligned with the at least one switch arm.

9. The switchgear device of claim 1 wherein the interior compartment comprises an upper compartment above the electrical breaker component, and a lower compartment below the electrical breaker component; and further comprising three incoming cable connectors carried in the upper compartment, and three outgoing cable connectors carried in the lower compartment.

10. The switchgear device of claim 9 wherein the first optical sensor is carried within the upper compartment; further comprising a second optical sensor carried within the lower compartment and coupled to the controller, and a third optical sensor and a fourth optical sensor carried outside the interior compartment and coupled to the controller; and wherein the controller is configured to cause the grounding switch to switch to the second closed state based upon any of the first optical sensor, the second optical sensor, the third optical sensor, and the fourth optical sensor.

11. A switchgear device comprising:
a frame defining an interior compartment;
an electrical breaker component carried within the interior compartment, the interior compartment comprising an upper compartment above the electrical breaker component, and a lower compartment below the electrical breaker component;
three incoming cable connectors carried in the upper compartment, and three outgoing cable connectors carried in the lower compartment;
a first optical sensor carried within the interior compartment;
a grounding device coupled to the electrical breaker component, the grounding device being within the interior compartment and being accessible from an exterior of the frame, the grounding device comprising:
a grounding switch switching between a first open state and a second closed state, and
an actuation device coupled to the grounding switch and configured to cause the grounding switch to switch between the first open state and the second closed state; and
a controller coupled to the electrical breaker component, the first optical sensor, and the grounding device and configured to cause the grounding switch to switch to the second closed state based upon the first optical sensor.

12. The switchgear device of claim 11 further comprising a plurality of mirrors carried within the interior compartment and aligned with the first optical sensor.

13. The switchgear device of claim 11 wherein the actuation device comprises one of a magnetic actuation device, an electrical actuation device, and a mechanical actuation device.

14. The switchgear device of claim 11 wherein the controller is configured to cause the electrical breaker component to switch to an open state based upon the first optical sensor.

15. The switchgear device of claim 11 wherein the grounding device comprises an axle, and a linkage coupled to the axle, the grounding switch coupled to the linkage; and wherein the grounding switch comprises at least one switch arm coupled to the linkage and having a first end, and a second end opposite the first end, the first end being coupled to the frame.

16. The switchgear device of claim 15 wherein the actuation device is coupled to a distal end of the axle; and wherein the frame comprises at least one viewing window carried thereby and aligned with the at least one switch arm.

17. The switchgear device of claim 11 wherein the first optical sensor is carried within the upper compartment; further comprising a second optical sensor carried within the lower compartment and coupled to the controller, and a third optical sensor and a fourth optical sensor carried outside the interior compartment and coupled to the controller; and wherein the controller is configured to cause the grounding switch to switch to the second closed state based upon any of the first optical sensor, the second optical sensor, the third optical sensor, and the fourth optical sensor.

18. A method of making a switchgear device, the method comprising:
coupling an electrical breaker component carried within an interior compartment of a frame;
coupling a first optical sensor carried within the interior compartment;
coupling a grounding device to the electrical breaker component and being within the interior compartment, the grounding device comprising:

a grounding switch switching between a first open state and a second closed state, an an actuation device coupled to the grounding switch and configured to cause the grounding switch to switch between the first open state and the second closed state; and coupling a controller to the electrical breaker component, the first optical sensor, and the grounding device and configured to cause the grounding switch to switch to the second closed state based upon the first optical sensor.

19. The method of claim 18 wherein the grounding device is accessible from an exterior of the frame.

20. The method of claim 18 further comprising a plurality of mirrors carried within the interior compartment and aligned with the first optical sensor; and wherein the actuation device comprises one of a magnetic actuation device, an electrical actuation device, and a mechanical actuation device.

* * * * *